US011874077B2

(12) United States Patent
Watkins et al.

(10) Patent No.: US 11,874,077 B2
(45) Date of Patent: Jan. 16, 2024

(54) FLEXIBLE LANCE DRIVE APPARATUS WITH AUTOSTROKE FUNCTION

(71) Applicant: STONEAGE, INC., Durango, CO (US)

(72) Inventors: Travis Watkins, Hesperus, CO (US); Jeffery R. Barnes, Ignacio, CO (US); Daniel Szabo, Durango, CO (US); Cody R. Montoya, Aztec, NM (US)

(73) Assignee: STONEAGE, INC., Durango, CO (US)

( * ) Notice: Subject to any disclaimer, the term of this patent is extended or adjusted under 35 U.S.C. 154(b) by 0 days.

(21) Appl. No.: 17/959,237

(22) Filed: Oct. 3, 2022

(65) Prior Publication Data

US 2023/0028473 A1 Jan. 26, 2023

Related U.S. Application Data

(60) Continuation of application No. 16/663,149, filed on Oct. 24, 2019, now Pat. No. 11,460,257, which is a continuation-in-part of application No. 16/119,586, filed on Aug. 31, 2018, now abandoned, which is a division of application No. 15/270,926, filed on Sep. 20, 2016, now abandoned.

(60) Provisional application No. 62/751,423, filed on Oct. 26, 2018, provisional application No. 62/240,169, filed on Oct. 12, 2015.

(51) Int. Cl.
| | |
|---|---|
| *F28G 1/04* | (2006.01) |
| *F28G 15/00* | (2006.01) |
| *F28G 3/16* | (2006.01) |
| *F28G 15/04* | (2006.01) |
| *B08B 9/043* | (2006.01) |
| *B65G 43/04* | (2006.01) |

(52) U.S. Cl.
CPC ............ *F28G 1/04* (2013.01); *B08B 9/043* (2013.01); *B08B 9/0433* (2013.01); *B65G 43/04* (2013.01); *F28G 3/163* (2013.01); *F28G 15/003* (2013.01); *F28G 15/04* (2013.01)

(58) Field of Classification Search
CPC .......... F28G 1/04; F28G 15/04; F28G 15/003; F28G 3/163; B08B 9/043; B08B 9/0433; B65G 43/04
See application file for complete search history.

(56) References Cited

U.S. PATENT DOCUMENTS

| | | | | |
|---|---|---|---|---|
| 3,720,992 A | * | 3/1973 | Hyatt | ................... B23P 23/04 29/430 |
| 3,903,912 A | * | 9/1975 | Ice, Jr. | .................. F28G 15/04 15/317 |

(Continued)

*Primary Examiner* — Benjamin L Osterhout
(74) *Attorney, Agent, or Firm* — Stephen Y. Liu; Carstens, Allen & Gourley, LLP

(57) ABSTRACT

An apparatus for sensing an obstruction within a tube being cleaned and repetitively advancing and retracting a flexible high pressure fluid cleaning lance within the tube is disclosed. The apparatus monitors drive roller/belt position and actual hose position, compares the belt (expected travel) to hose position (travel) and generates a position difference, or mismatch. If the mismatch is above a predetermined level, the drive motor direction is reversed for a predetermined time interval, and forward operation restored after the predetermined time interval; and the sequence of repeating the reversing and restoring operations is continued until the position difference or mismatch no longer exceeds the predetermined difference threshold.

23 Claims, 12 Drawing Sheets

(56) References Cited

U.S. PATENT DOCUMENTS

| | | | | |
|---|---|---|---|---|
| 4,576,123 | A * | 3/1986 | Lahoda | F28G 15/003 122/382 |
| 4,887,499 | A * | 12/1989 | Kipfelsberger | B25B 23/145 173/177 |
| 5,423,917 | A * | 6/1995 | Garcia, Jr. | B08B 9/0328 134/22.12 |
| 6,681,839 | B1 * | 1/2004 | Balzer | F28G 15/04 165/95 |
| 6,757,932 | B1 * | 7/2004 | Verstraeten | B08B 9/0433 15/316.1 |
| 8,057,607 | B2 * | 11/2011 | Gardner | B08B 9/04 134/167 C |
| 8,308,869 | B2 * | 11/2012 | Gardner | F28G 15/003 134/166 C |
| 8,524,011 | B2 * | 9/2013 | Gardner | F28G 15/003 134/169 C |
| 11,460,257 | B2 * | 10/2022 | Watkins | F28G 3/163 |
| 2007/0057418 | A1 * | 3/2007 | Verstraeten | B08B 9/0325 266/226 |
| 2009/0255557 | A1 * | 10/2009 | Gardner | F28G 15/02 701/25 |
| 2012/0055512 | A1 * | 3/2012 | Gardner | F28G 15/08 134/18 |
| 2012/0055520 | A1 * | 3/2012 | Gardner | F28G 15/02 134/167 C |
| 2014/0109936 | A1 * | 4/2014 | Gromes, Sr. | F28G 15/003 134/18 |
| 2015/0034128 | A1 * | 2/2015 | Brumfield | F28G 15/04 134/167 C |
| 2020/0056851 | A1 * | 2/2020 | Watkins | F28G 1/04 |

* cited by examiner

FLEXIBLE LANCE DRIVE APPARATUS WITH AUTOSTROKE FUNCTION

CROSS REFERENCE TO RELATED APPLICATIONS

This application is a continuation application of co-pending U.S. patent application Ser. No. 16/663,149 entitled "Flexible Lance Drive Apparatus with Autostroke Function" filed on Oct. 24, 2019. U.S. patent application Ser. No. 16/663,149 claims the benefit of priority of U.S. Provisional Patent Application No. 62/751,423, filed Oct. 26, 2018. U.S. patent application Ser. No. 16/663,149 also is a continuation-in-part of U.S. patent application Ser. No. 16/119,586 filed Aug. 31, 2018, which is a divisional of U.S. patent application Ser. No. 15/270,926 filed Sep. 20, 2016, having the above title, which claims the benefit of priority of U.S. Provisional Patent Application No. 62/240,169 filed Oct. 12, 2015. All the applications, publications, and patents listed in this paragraph are hereby incorporated by reference in their entireties as examples.

BACKGROUND OF THE DISCLOSURE

The present disclosure is directed to high pressure fluid rotary nozzle handling systems. In particular, embodiments of the present disclosure are directed to an apparatus for advancing and retracting one or more flexible tube cleaning lances from tubes arranged in an array, such as in a heat exchanger, from a position adjacent a heat exchanger tube sheet, and automatically repetitively reversing forward lance feed movement upon encountering an obstruction within a tube or other piping system being cleaned.

One conventional tube lancing apparatus consists of a rotating reel flexible lance hose take-up and hose dispensing apparatus that carries a predetermined length of flexible lance hose wrapped around a drum. The reel in the drum is rotated by an air motor to push the flexible lance out of the drum and into one or two heat exchanger tubes. The air motor drive can be automatically reversed upon pneumatically sensing a large air pressure increase in air pressure supplied to the forward directional side motor that occurs if the flexible lance being pushed by the reel rotation encounters an obstruction within a tube being cleaned. In this instance, when such a pressure increase is sensed, an air operated valve to the air motor drive shuts off air to the forward side of the air motor and supplies air to the opposite side of the air motor, the air motor reverses, withdrawing the lance for a predetermined time/distance. This automatic reversal of the air motor drive can then be repeated until the obstruction within the tube is removed. In this manner, the flexible lance "pecks" at a restriction, or obstruction, within the tube until the undesirable pressure increase is no longer sensed (indicating that the obstruction has been removed). This drum and reel apparatus necessarily must be somewhat remotely located from the heat exchanger tube sheet in order to accommodate the size of the drum and air drive motor apparatus.

One problem with this approach is that it takes a substantial increase in air pressure—virtually a stall of the flexible lance within the tube, to cause the pressure to increase sufficiently to trigger reversal. Furthermore, if the flexible lance is far within a tube being cleaned, the length of hose within the tube generates resistance against the forward air motor supply pressure pushing the hose into and through the tube, which itself can cause an increase in air supply pressure without there actually being a lance stall. Hence a sufficient pressure change to trigger reversal can occur without the lance actually encountering an obstacle. Further, the forward air pressure applied in a forward direction to the drive motor in typical industrial cleaning operations generally varies widely and thus the conventional system is prone to spurious pneumatic pressure spikes and hence reversals are frequent. This is undesirable. What is needed therefore is an apparatus and method for reliably detecting a restriction within a heat exchanger tube or other piping system conduit being cleaned reliably and with precision.

SUMMARY OF THE DISCLOSURE

A flexible lance drive apparatus and an automatic blockage sensor in accordance with the present disclosure directly addresses such needs. One exemplary embodiment of a flexible lance drive apparatus in accordance with the present disclosure includes a generally rectangular housing having an array of upper and lower drive rollers in an outer section each rotatably supported by an axle shaft passing laterally through spaced outer and inner walls defining a mid section of the housing. A pneumatic drive motor is housed within the mid section of the housing and is connected to each of the upper and lower drive rollers. Each lower drive roller shaft is rotatably supported in a fixed position and the upper rollers may be lowered against the lower rollers via a pneumatic cylinder to sandwich a flexible lance therebetween. This drive apparatus may be positioned adjacent an entrance into a piping system to be cleaned, such as mounted on a frame fastened to a tube sheet of a heat exchanger tube bundle.

A control console is connected to the drive motor and to the pneumatic cylinder in the drive apparatus via forward and reverse pneumatic pressure supply lines such that an operator can stand at the control console remotely from the drive apparatus so as to avoid the high pressure water spray from the apparatus during operation. The console has forward and reverse manual controls for directing pneumatic pressure via the pneumatic lines to forward and reverse sides of the drive motor. In this embodiment a four way solenoid valve is connected across the forward and reverse pressure lines adjacent the control console. This solenoid valve is operable to reverse the pneumatic pressure connections to the drive motor when energized.

An automatic blockage sensing circuit, in one exemplary embodiment, is mounted within the control console or attached to it, remote from the lance drive apparatus. In other embodiments, the automatic blockage sensing circuit may be housed within the drive apparatus itself. This circuit is operable to sense, at the pneumatic drive motor, a drive motor pressure differential increase above a predetermined threshold and energize the solenoid valve to reverse the pneumatic pressure line connections to the drive motor when this occurs. This function of the automatic blockage sensing circuit and the four way solenoid valve are operable only when the forward manual control at the control console is supplying pneumatic pressure to the drive motor.

The automatic blockage sensing circuit comprises a first pressure transducer connected to a forward air port at the drive motor and a second pressure transducer connected to a reverse air port at the drive motor via sensing lines connected directly to the drive motor, and a microcontroller configured to monitor a differential pressure between the transducers, compare the differential pressure to a predetermined threshold and generate an electrical current output when the threshold is exceeded.

The present disclosure also describes a method of automatically clearing an obstruction encountered while cleaning one or more tubes in a tube sheet of a heat exchanger with a flexible lance drive apparatus having a linear array of driven rollers propelling one or more flexible lances into the one or more tubes. This method includes sensing a pneumatic supply pressure applied to a pneumatic lance drive motor at the pneumatic lance drive motor during forward operation; sensing a pneumatic pressure at an opposite side of the drive motor during forward operation; determining a difference between the pressures; comparing the difference to a predetermined difference threshold; and reversing the supply line connections to the drive motor so as to reverse motor direction for a predetermined time interval if the difference exceeds the threshold The process may include restoring the supply line connections after the predetermined time interval and repeating the sensing, reversing and restoring operations until the difference no longer exceeds the predetermined difference threshold.

An exemplary embodiment in accordance with the present disclosure may alternatively be viewed as a flexible high pressure fluid cleaning lance drive apparatus that includes a housing, at least one drive motor having a drive axle in the housing carrying a cylindrical spline drive roller, and a plurality of cylindrical guide rollers on fixed axles aligned parallel to the spline drive roller. A side surface of each guide roller and the at least one spline drive roller is tangent to a common plane between the rollers. An endless belt is wrapped around the at least one spline drive roller and the guide rollers. The belt has a transverse splined inner surface having splines shaped complementary to splines on the spline drive roller.

The drive apparatus further has a bias member supporting a plurality of follower rollers each aligned above one of the at least one spline drive roller and guide rollers, wherein the bias member is operable to press each follower roller toward one of the spline drive rollers and guide rollers to frictionally grip a flexible lance hose when sandwiched between the follower rollers and the endless belt. The apparatus includes a first sensor coupled to the drive roller for sensing position of the endless belt, a second sensor coupled to a first one of the follower rollers for sensing position of the first follower roller relative to a first flexible lance hose sandwiched between the first follower roller and the endless belt, and at least a first comparator coupled to the first and second sensors operable to determine a first mismatch between the first follower roller position and the endless belt position.

The apparatus preferably further includes a third sensor coupled to a second one of the follower rollers for sensing position of the second one of the follower rollers relative to a second flexible lance hose sandwiched between the second one of the follower rollers and the endless belt. The exemplary apparatus also may include a second comparator operable to compare the second follower roller position to the endless belt position and determine a second mismatch between the second follower roller position and the endless belt position.

Preferably a controller is coupled to the first comparator and the second comparator operable to initiate an autostroke sequence of operations upon the first mismatch and second mismatch differing by a predetermined threshold. A fourth sensor may be coupled to a third one of the follower rollers for sensing position of the third one of the follower rollers relative to a third flexible lance hose sandwiched between the third one of the follower rollers and the endless belt. Also, a third comparator may be provided operable to compare the third follower roller position to the endless belt position and determine a third mismatch between the third follower roller position and the endless belt position. The controller is preferably coupled to the first comparator, the second comparator and the third comparator and is operable to initiate an autostroke sequence of operations upon any one of the first, second and third mismatches exceeding a predetermined threshold. Furthermore, the controller is preferably operable to modify clamping pressure if more than one of the first, second and third mismatches exceed a different predetermined threshold. The sensors may be magnetic or preferably Hall effect sensors.

A flexible high pressure fluid cleaning lance drive apparatus in accordance with the present disclosure may comprise a housing, at least one drive motor having a drive axle in the housing carrying a cylindrical spline drive roller, a plurality of cylindrical guide rollers on fixed axles aligned parallel to the spline drive roller, and wherein a side surface of each guide roller and the at least one spline drive roller is tangent to a common plane between the rollers, an endless belt wrapped around the at least one spline drive roller and the guide rollers, the belt having a transverse splined inner surface having splines shaped complementary to splines on the spline drive roller, a bias member supporting a plurality of follower rollers each aligned above one of the at least one spline drive roller and guide rollers, wherein the bias member is operable to press each follower roller toward one of the spline drive rollers and guide rollers to frictionally grip a flexible lance hose when sandwiched between the follower rollers and the endless belt.

The apparatus includes a first sensor coupled to the drive roller for sensing endless belt position and a plurality of second sensors each coupled to one of the plurality of follower rollers each for sensing position of the one of the follower rollers relative to a flexible lance hose sandwiched between the one of the follower rollers and the endless belt. The apparatus preferably includes a first comparator coupled to the first sensor and each second sensor operable to determine a mismatch between each follower roller position and the endless belt position. The apparatus may further include a second comparator operable to compare each of the plurality of flexible lance hose positions with each other to determine another mismatch therebetween and a controller coupled to the second comparator operable to initiate an autostroke sequence of operations upon the another mismatch exceeding a predetermined threshold.

An apparatus in accordance with the present disclosure may alternatively be viewed as including a housing, at least one drive motor having a drive axle in the housing carrying a cylindrical drive roller, a plurality of cylindrical guide rollers on fixed axles aligned parallel to the drive roller, and wherein a side surface of each guide roller and the at least one drive roller is tangent to a common plane between the rollers, an endless belt wrapped around the at least one drive roller and the guide rollers, a bias member supporting a plurality of follower rollers each aligned above one of the at least one drive roller and guide rollers, wherein the bias member is operable to press each follower roller toward one of the drive rollers and guide rollers to frictionally grip a flexible lance hose when sandwiched between the follower rollers and the endless belt, a first sensor coupled to the drive roller for sensing endless belt position, a plurality of second sensors each coupled to one of the plurality of follower rollers each for sensing position of the one of the follower rollers relative to a flexible lance hose sandwiched between the one of the follower rollers and the endless belt, a first comparator coupled to the first sensor and each second sensor operable to determine a mismatch between each follower roller position and the endless belt position, and a second comparator coupled to each of the second sensors operable to determine a mismatch between any two of the follower roller positions. The apparatus may also preferably include a controller coupled to the second comparator operable to initiate an autostroke sequence of operations upon the mismatch exceeding a predetermined threshold and may further include the controller being operable to initiate a change of clamp pressure if the mismatch between the follower roller positions and the belt position all or at least more than one, exceed a predetermined threshold.

Further features, advantages and characteristics of the embodiments of this disclosure will be apparent from reading the following detailed description when taken in conjunction with the drawing figures.

DETAILED DESCRIPTION

Figure 1:
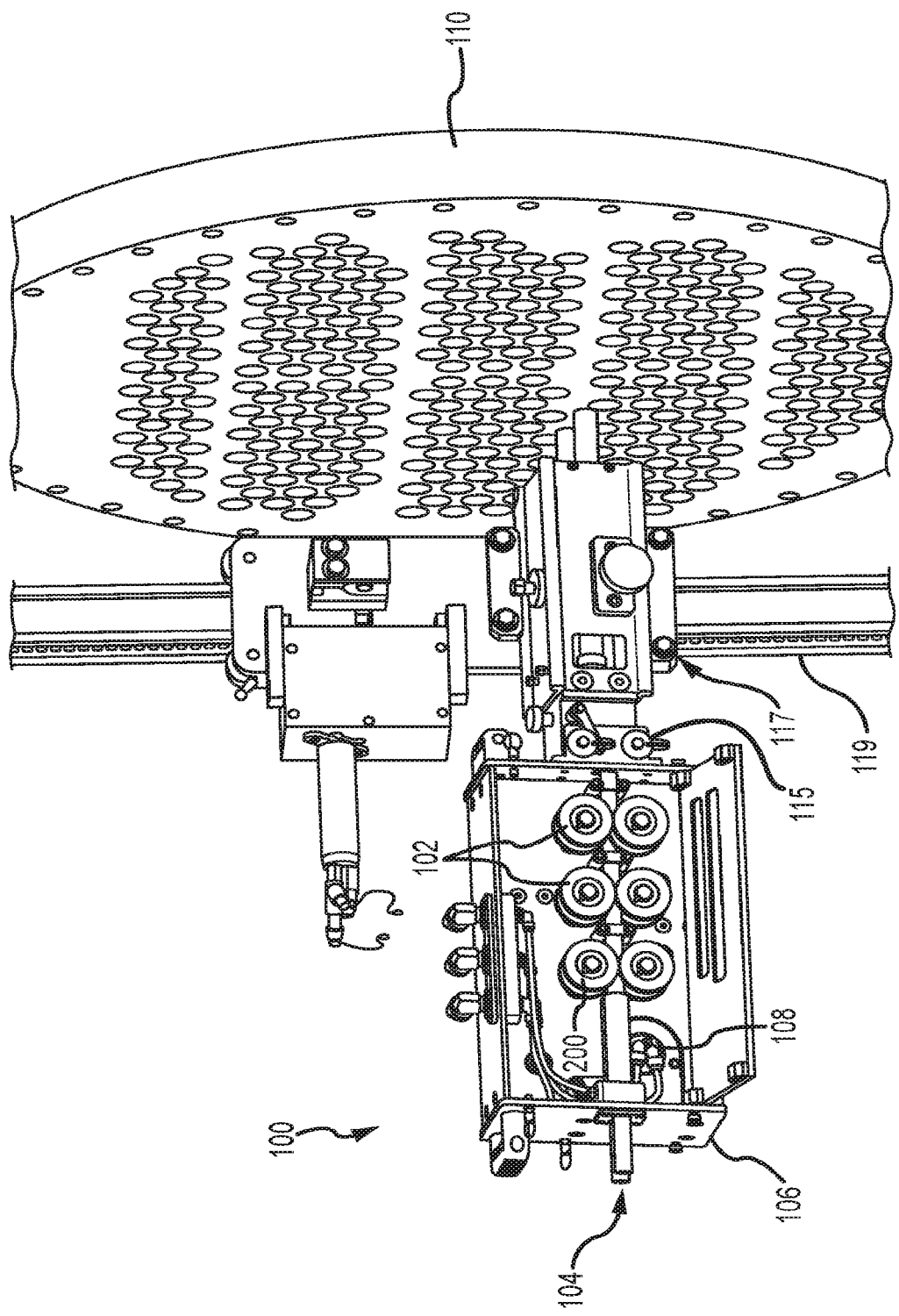
FIG. 1 is a perspective view of a flexible lance drive apparatus in accordance with the present disclosure.

An exemplary drive apparatus 100 incorporating an automatic blockage sensor in accordance with the present disclosure is shown in FIG. 1 with a side cover open showing the set of 3 pairs of drive rollers 102 arranged for driving two flexible lances 104 in accordance with one embodiment of the present disclosure. The apparatus 100 includes a housing 106 in which a drive motor 108 drives each of the six drive rollers 102. FIG. 1 shows a drive apparatus 100 supported for guiding one or more flexible lance hoses 104 into and out of a tube in a tube sheet 110. The drive apparatus 100 is typically mounted on a flexible lance guide 117 which is fastened to a frame 119 that places the drive apparatus 100 in alignment with the tubes penetrating the tube sheet 110.

Figure 2:
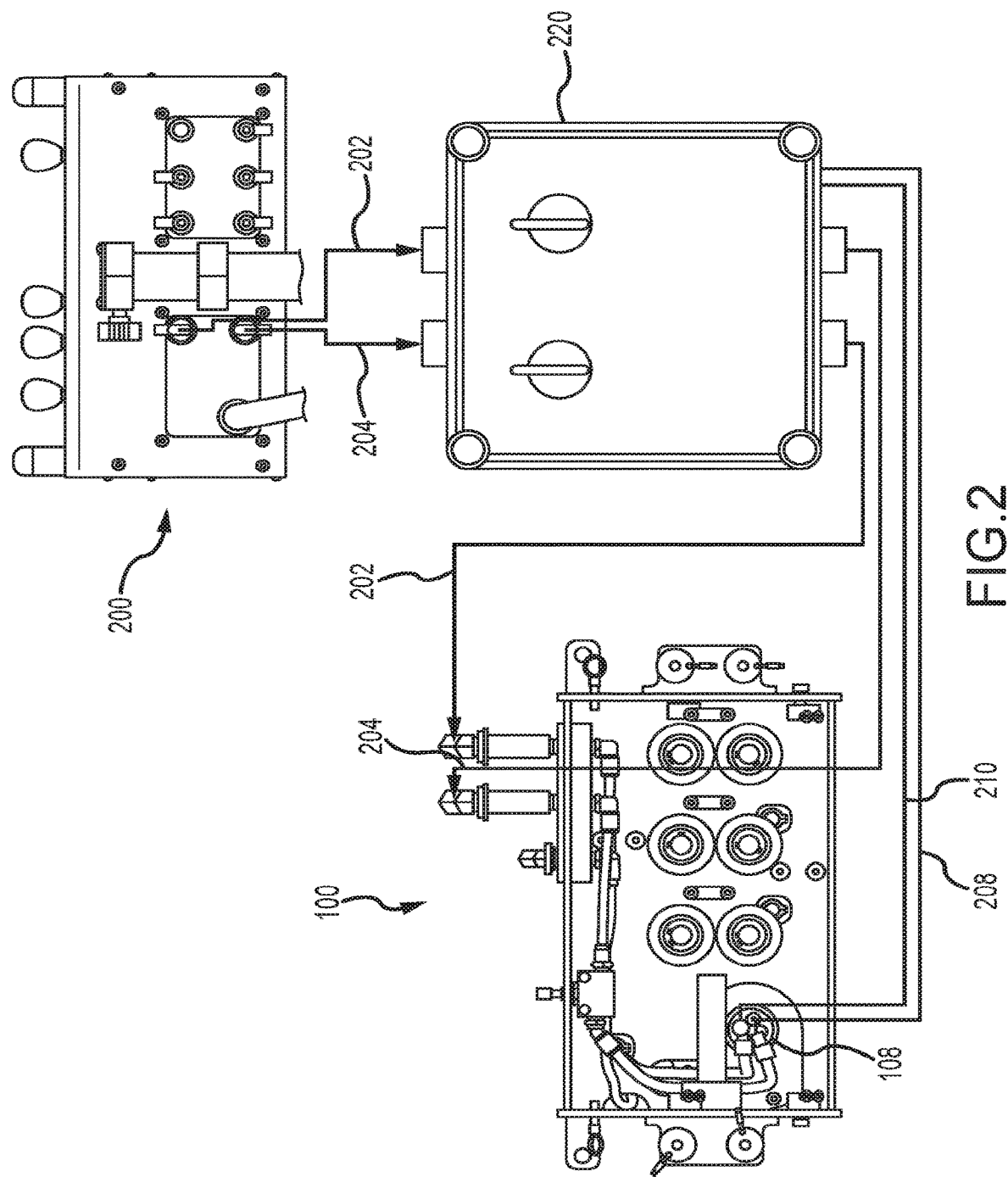
FIG. 2 is a diagram of the pneumatic connections between a remote operator's control console and the drive apparatus shown in FIG. 1.

The drive apparatus 100 is pneumatically remotely controlled via a control console 200, as shown in FIG. 2, carried by or positioned adjacent to an operator (not shown) standing a safe distance from the apparatus 100. Attached to the control console 200 is an automatic blockage sensing control circuit box 220. This automatic blockage sensing control circuit box 220 houses an electronic monitoring circuit that monitors air motor pressure at the air motor 108 in the drive apparatus 100 shown in FIG. 1 and controls a solenoid valve also located in or adjacent to the box 220 as will be described more fully below.

The operator preferably can stand about 20-40 feet from the drive apparatus 100. The operator pneumatic control console 200, shown in FIG. 2, in accordance with the present disclosure connects to an air pressure supply source line (not shown) and includes a forward line 202 connected to the air motor 108 in the drive apparatus 100, a retract, or reverse, line 204 connected to the air motor 108, and a clamp air line (not shown) that connects to an air cylinder in the housing 106 in the apparatus 100 for adjusting clamp pressure of the row of upper rollers 102 on the lance(s) 104.

A pair of pressure sensing lines 208 and 210 is connected directly to the forward and reverse ports on the motor 108 in the apparatus 100. These sensing lines 208 and 210 connect to a pair of pressure transducers 212 and 214 mounted in the control box 220 shown in the schematic diagram shown in FIG. 3. Each pressure transducer 212 and 214 produces an electrical signal, either current or voltage, proportional to the pressure sensed at its particular side of the air motor 108.

The automatic blockage sensing control box 220 includes a microcontroller 222 that utilizes the forward pressure signal from transducer 212 to determine when to institute an autostroke cycle or event. More precisely, the microcontroller 222 utilizes the signals from both transducer 212 and 214 to compute a pressure differential. When the pressure differential exceeds a threshold value the autostroke event is triggered. When the pressure difference between the applied air pressure in the forward direction through line 202 sensed at the air motor 108 and the pressure sensed at the reverse port at the air motor 108 increases to a predetermined value indicative of high torque caused by the nozzles encountering a restriction or blockage in the tube(s) being cleaned, the microcontroller 222 produces an output on lines A1-A2 which closes a switch 224 to apply 12 volts DC to a solenoid valve 226 through which the forward and reverse lines 202 and 204 are connected. This switch 224 is preferably a solid state transistor switch. When the solenoid valve 226 is energized, the ports within the valve 226 redirect the forward air motor pressure to the opposite (reverse) side of the air motor 108. After a predetermined period of motor reversal, the solenoid valve 226 is de-energized and the forward air pressure restored to the forward port of the motor 108, at which time forward lance movement resumes if the operator is still pressing the forward control button. If the obstruction is again met, motor pressure again increases as the motor bogs down, and the process repeats.

The automatic blockage sensor control box 220 has two potentiometers 228 and 230. Potentiometer 228 is used to adjust the threshold pressure differential at which the microcontroller 222 will close the switch 224 to energize the solenoid 226, and thereby direct forward drive pneumatic pressure to the reverse port of the air motor 108. The potentiometer 230 is used to adjust the length of time that pneumatic pressure is diverted to the reverse direction of air motor 108, and hence the lance retraction distance before air pressure is restored to the forward direction of the air motor 108.

The microcontroller 222 continually monitors and compares this threshold to the sensed forward pressure via transducer 212. If the pressure difference rises above the threshold, an autostroke event is triggered. When this occurs while the operator is holding the "Hose Feed" control in the forward direction, the microcontroller 222 actuates the solenoid valve 226 which reverses the pneumatic pressure connection from the forward feed line 202 to the reverse line 204. This solenoid valve 226 is a 5-way two position valve that is internally piloted. The forward air hose 202 is connected to the pressure port of the valve 226 and the reverse air hose 204 is tee'd to both of the exhaust ports on the valve which effectively makes valve 226 a 4 way valve. Because the solenoid valve 226 is internally piloted, it will only shift when the operator is driving the drive apparatus 100 forward.

Figure 3:
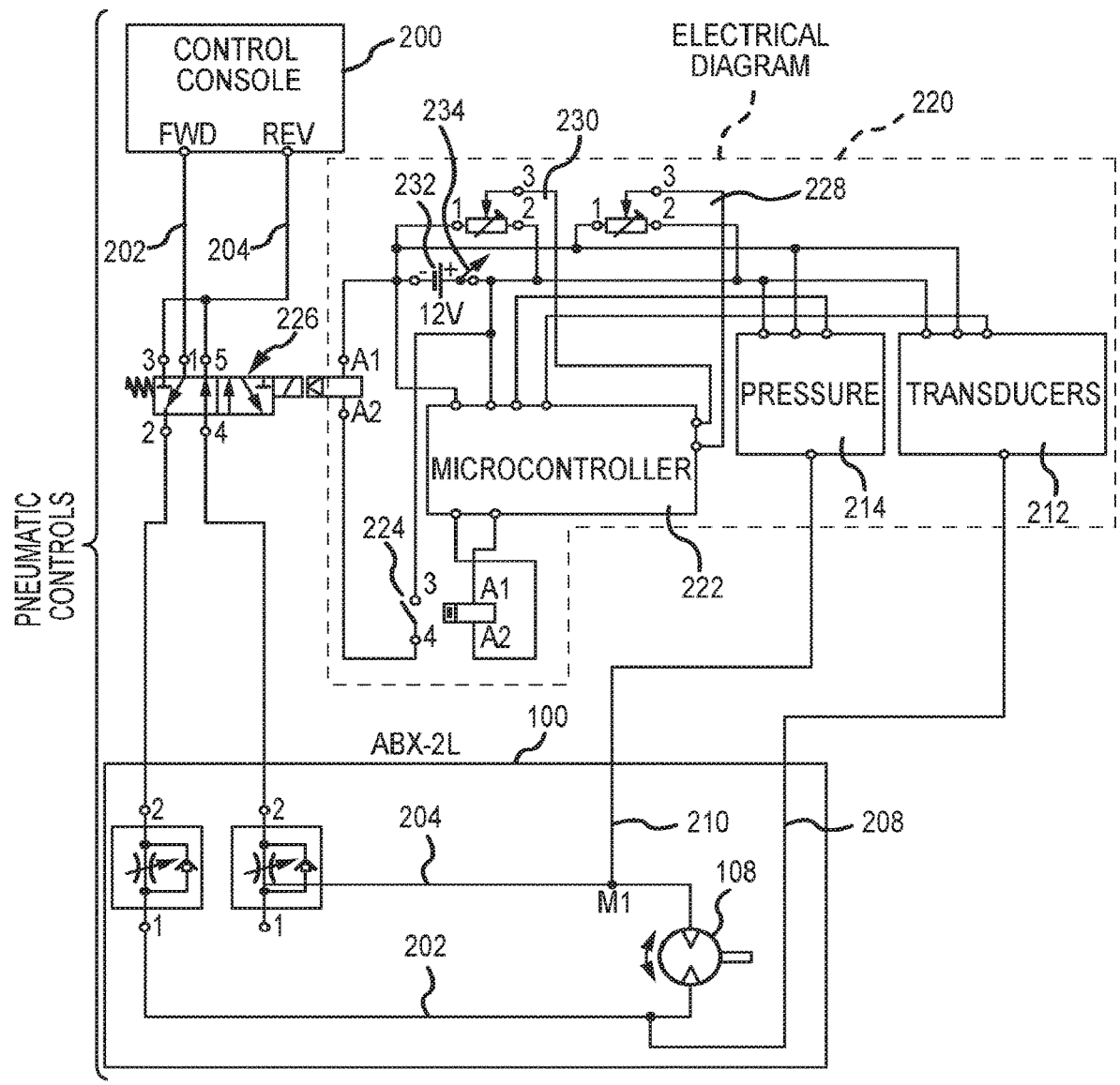
FIG. 3 is a schematic electrical and pneumatic control diagram of the apparatus shown in FIG. 2.

FIG. 3 is a composite schematic of the pneumatic system between the separate control console 200 and the drive apparatus 100, and incorporates, in the dashed portion, the electronic circuitry within the automatic blockage sensor control box 220. The solenoid valve 226 may be mounted within the control box 220 or it may be mounted separately between the control box 220 and the drive apparatus 100.

Alternatively the control box 220 and the solenoid valve 226 could be integrated completely into the housing of the drive apparatus 200.

In FIG. 3, the power source 232 is shown as being 12 volts DC. Other supply voltages may be utilized depending on the requirements of the microcontroller 222 and the solenoid valve 226. Furthermore, the power source 232 may be a battery, a series of batteries, or, for example, a pneumatic/electric generator appropriately selected according to the power requirements of the solenoid valve 226 and the microcontroller 222. An on-off switch 234 is also provided in series with the power source 232 to remove the autostroke functionality when not desired.

Figure 4:
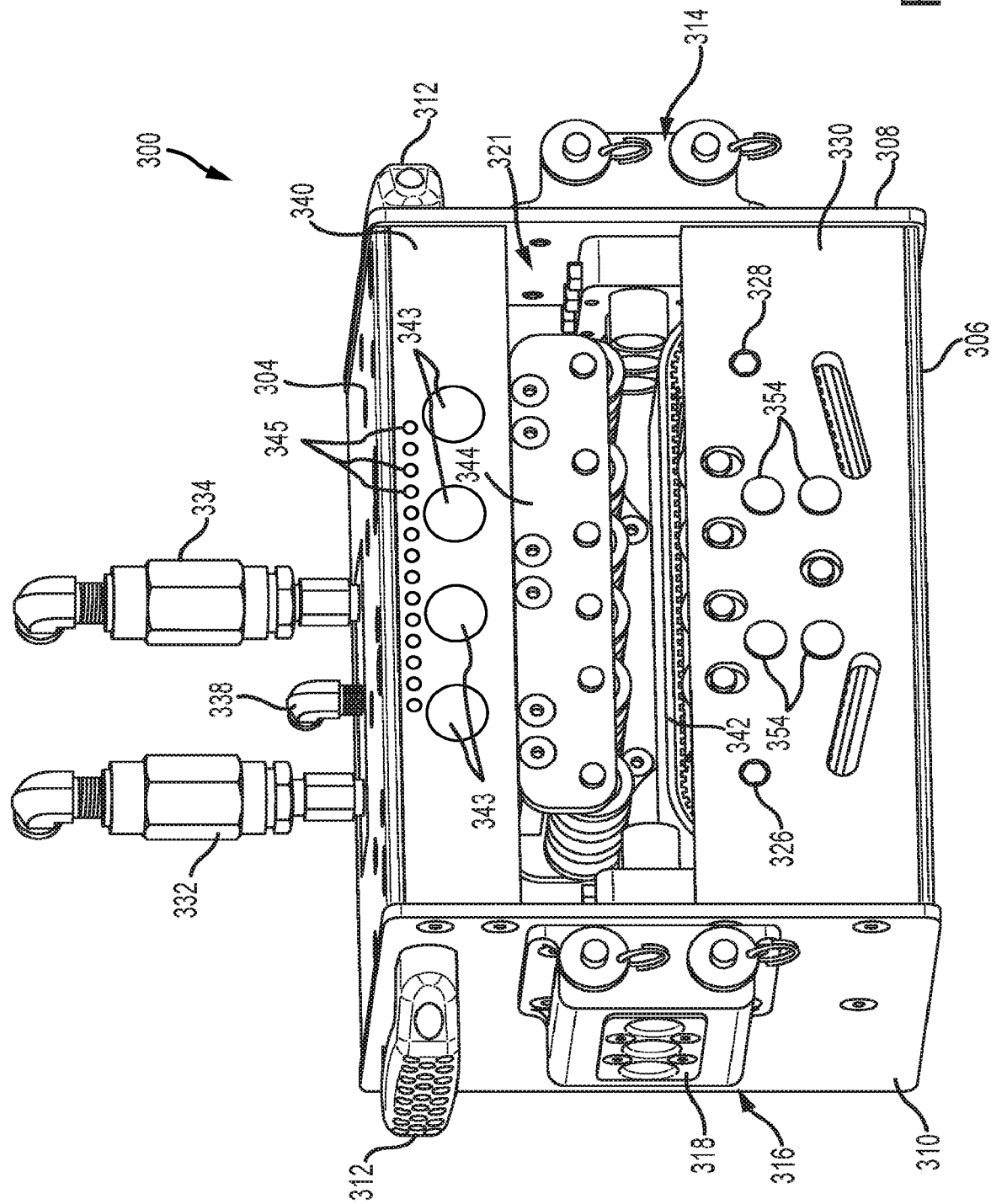
FIG. 4 is a side perspective view of another flexible lance drive apparatus incorporating an embodiment of an autostroke functionality in accordance with the present disclosure, shown with its outer side door removed.

Another embodiment of a multiple lance drive apparatus 300 incorporating an autostroke functionality for each lance driven by the drive apparatus 300 is shown in FIGS. 4-9. Referring now to FIG. 4, a belt side view of the apparatus 300 is shown with its side cover removed. The drive apparatus 300 has a rectangular box housing 302 that includes a flat top plate 304, a bottom plate 306, front and rear walls 308 and 310, and two C shaped carry handles 312, one on each of the front and rear walls 308 and 310. In FIGS. 4-10, sheet side covers (not shown) are removed so that internal components of the apparatus 300 are visible.

Fastened to the front wall 308 is an exit hose guide manifold 314. Fastened to the rear wall 310 below the carry handle 312 is a hose entrance guide manifold 316. Each of these manifolds 314 and 316 includes a set of hose guide collets 318 for guiding one to three flexible lance hoses (not shown) into and out of the housing 302. Each guide collet set 318 is sized to accommodate a particular lance hose diameter. Hence the collet sets are changeable depending on the lance size to be driven by the apparatus 300. Each of the manifolds 314 and 316 includes a sensor, typically a hall effect sensor (not shown) for detecting presence or absence of a metal hose stop element that is fastened to each flexible lance hose. These sensors are used to stop the apparatus 300 when presence of a hose stop element is sensed. One hose stop element is preferably integrated into the threaded hose ferrule to which a nozzle is attached, at the end of each of the lance hoses. This particular hose stop element is configured to prevent inadvertent withdrawal of the flexible lance out of the heat exchanger tube sheet and into the drive apparatus 300. The forward manifold 314 may also include a physical collet assembly to mechanically prevent flexible lance nozzle withdrawal into the drive apparatus 300. Another hose stop element is removably fastened to each of the lance hoses short of the rear manifold 316 to prevent over insertion of a flexible lance beyond the tube being cleaned. These removable hose stop elements may pairs of C shaped metal clamps that are fastened to the hose at a predetermined hose length from the nozzle end to indicate full insertion of the flexible lance through a target tube sheet and tube being cleaned.

Figure 5:
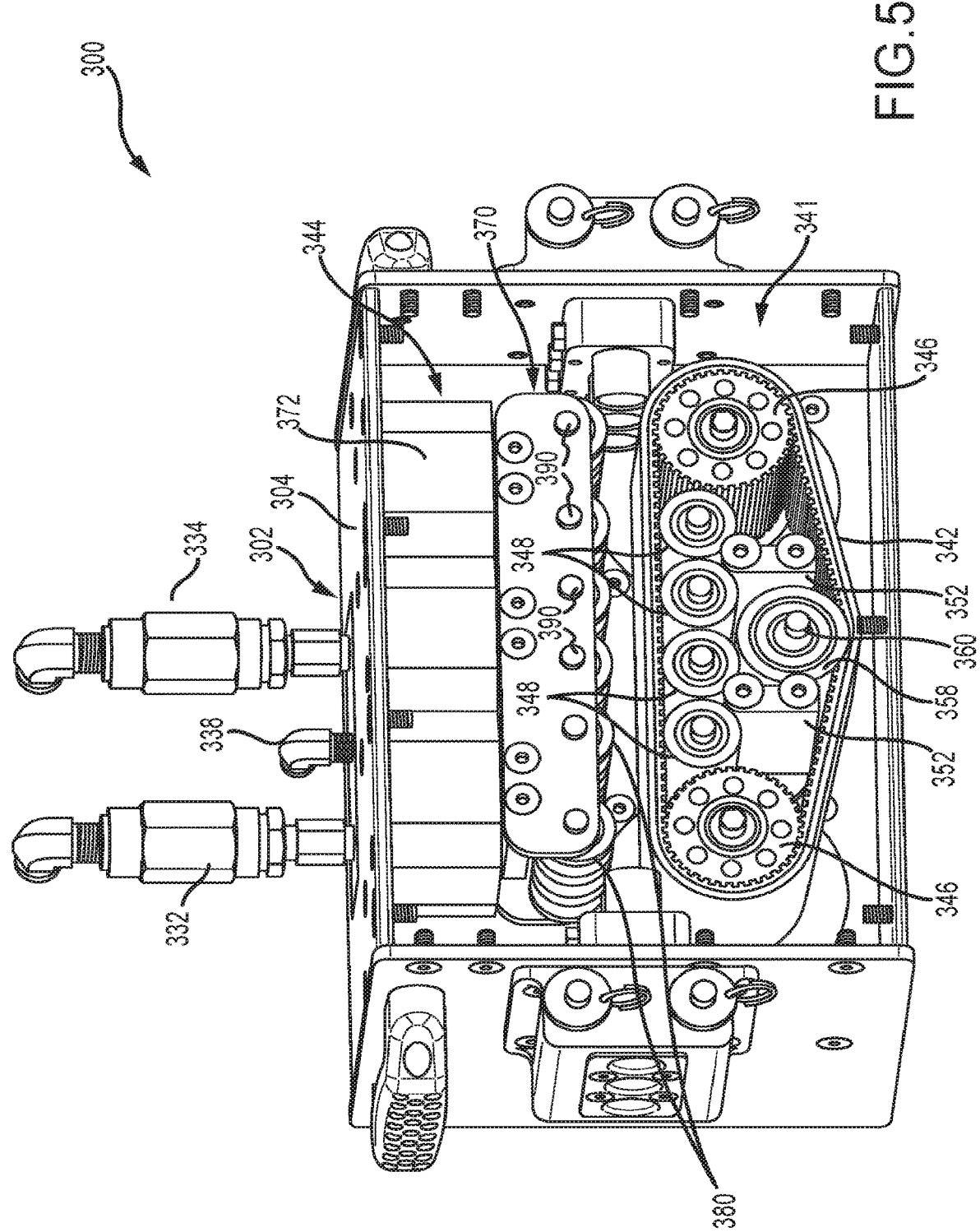
FIG. 5 is a side perspective view of the drive apparatus shown in FIG. 4 with upper and lower side plates removed to show the belt drive structure.
Figure 6:
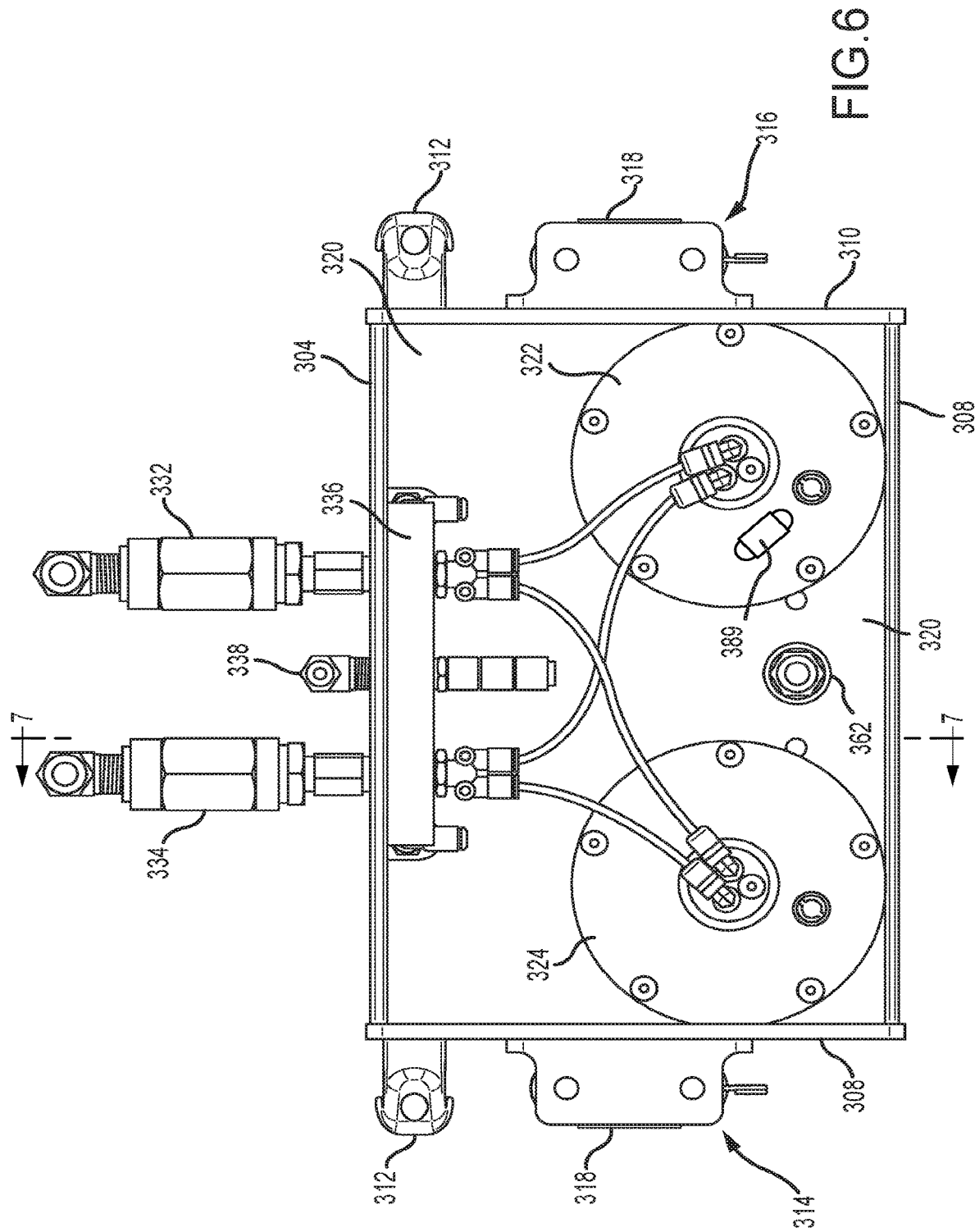
FIG. 6 is an opposite side view of the drive apparatus shown in FIG. 4, again with an outer side door removed for clarity.

A motor side view of the apparatus 300 is shown in FIG. 6 with its outer side cover removed. The housing 302 includes an inner vertical support partition wall 320 fastened to the front and rear walls 308 and 310 and the top and bottom plates 304 and 306. This vertical support partition wall 320 divides the housing into a first portion and a second portion. The first portion primarily houses hose fittings and splined belt drive motors 322 and 324. The second portion is a belt cavity 321 through which flexible lance hoses (not shown) are driven, and is shown at least in FIGS. 4, 5 and 6.

In this exemplary embodiment 300, the inner vertical support wall 320 carries a pair of pneumatic drive motors 322 and 324 mounted such that their drive shafts 326 and 328 protrude laterally through the support wall 320 into the second portion, or belt cavity 321, between the inner vertical wall 320 and an outer vertical lower support wall 330, shown in FIGS. 4 and 5. Each of the drive motors 322 and 324 is connected to pneumatic forward feed line 332 and reverse feed line 334 through a feed manifold 336 fastened to the top plate 304. A clamp pressure feed line fitting 338 also passes through this feed manifold 336 to a hose clamp assembly 344 described below. Each of the drive motors 322 and 324, shown in FIG. 6, is preferably a compact radial piston pneumatic motor. However, hydraulic or electric motors could alternatively be used.

On the belt side view shown in FIGS. 4 and 5, the belt cavity 321 is defined between the inner vertical wall 320 and the outer lower support wall 330. A separate upper outer support wall 340 aligned with the lower outer support wall 330 provides a rigid joint between the front and rear walls 308 and 310 while providing a visible space between the entrance and exit guide manifolds 316 and 314. This spacing helps an operator thread up to three lances laterally into and through the belt cavity 321 between an endless drive belt 342 and a vertically arranged hose clamp assembly 344. Each of the support walls 320, 330 and 340 is preferable a flat plate of a lightweight material such as aluminum or could be made of a structural polymer with sufficient strength and rigidity to handle the motor operational stresses involved.

The upper outer support wall 340 carries a set of electrical connectors 343 for communication of sensed hose position, hose stop presence and belt position via the drive motor direction and position sensors described below, and a set of 14 LED lights 345 to indicate the status of each of these elements during drive apparatus operation.

A perspective view of the apparatus 300 with the upper and lower outer vertical support walls 340 and 330 removed is shown in FIG. 5. Each of the motor drive shafts 326 and 328 has an axial keyway fitted with a complementary key (not shown) that engages a corresponding keyway in a cylindrical splined drive roller 346. Thus each drive roller 346 is slipped onto and keyed to the drive shaft so as to rotate with the drive shaft 326 or 328. Each splined drive roller 346 has its outer cylindrical surface covered with equally spaced splines extending parallel to a central axis of the roller 346. The distal ends of each of the drive shafts 326 and 328 extends through the lower outer support wall 330 and are primarily laterally supported from plate 320. Additional lateral support for the distal ends of each of the drive shafts 326 and 328 is provided by the lower outer support wall 330 via cone point set screws engaging a V groove (not shown) in each of the shafts 326 and 328.

Each of the drive shafts 326 and 328 may extend fully through the splined drive rollers 346 or the drive motors 322 and 324 may each be fitted with a stub drive shaft which fits into a bearing within the proximal end of each of the splined drive rollers 346. A separate bearing supported drive shaft 326 or 328 extends out of the distal end of each drive roller 346 and is fastened to the support wall 330 via cone point set screws. In such an alternative, the drive rollers 346 become part of the drive shafts 326 and 328.

Spaced between the two splined drive rollers 346 is a set of four cylindrical guide rollers 348 that are supported by the lower outer support wall 330 via a vertical plate 350 and a pair of rectangular vertical spacer blocks 352 that are through bolted to both the lower outer support wall 330 and inner vertical wall 320 through the vertical plate 350 via bolts 354. While the bolts 354 pass through the vertical plate 350, their distal ends extend further through, and are threaded into holes through the inner vertical wall 320.

Tension on the endless belt 342 is preferably provided by a tensioner roller 358 between the spacer blocks 352 that is supported from the inner vertical plate 350 on an eccentric shaft 360, and accessed through an opening 362 in the inner vertical wall 320, shown in FIG. 6. Rotation of this eccentric shaft 360 essentially moves the tensioner roller 358 through a slight arc downward or upward to provide more or less tension on the belt 342.

To replace the belt 342, the four bolts 354 are loosened and screws holding the outer lower wall 330 to the front and rear walls 308 and 310 are removed. The cone point set screws engaging a V groove (not shown) in each of the shafts 326 and 328 are then removed. The assembled structure including the vertical plate 350, spacer blocks 352, belt 342, drive rollers 346, and guide rollers 348 can then be removed as a unit by sliding the drive rollers 346 off of the keyed shafts 326 and 328.

Each of the splined drive rollers 346 preferably has equally spaced alternating spline ridges and grooves around its outer surface which are rounded at transition corners so as to facilitate engagement of the complementary shaped lateral spline ridges and grooves in the inner side or surface of the endless belt 342. Elimination of sharp transitions at both ridge corners and groove corners lengthens belt life while ensuring proper grip between the rollers and the belt. The outer surface portion or cover of the endless belt 342 is preferably flat and smooth to prevent undesirable hose abrasion and degradation and is preferably formed of a suitable friction material such as polyurethane. The inner side portion of the belt 342 is preferably a harder durometer polyurethane material bonded to the outer side cover. For applications with significant hydrocarbons or high lubricity products, grooves machined across the cover at 90° to the direction of belt travel may be utilized for improved traction performance against the flexible lance hose.

Spaced above the belt 342 in the belt cavity is a lance hose clamp assembly 344 including an idler roller assembly 370. This exemplary clamp assembly 344 includes a multi-cylinder frame 372 fastened to the top plate 304 of the housing 302. The multi-cylinder frame 372 carries two or three single acting pneumatic cylinders with pistons 374 (shown in FIG. 7) that are each connected to a carrier block 376 and connected together via a pair of parallel spaced idler carrier frame rails 378. Six idler roller sets 380 are carried by the frame rails 378, each vertically positioned directly above either one of the drive rollers 346 or one of the guide rollers 348. Each piston 374 may be spring biased such that without pneumatic pressure, the pistons 374 are all withdrawn or retracted fully into the multi-cylinder frame 372 so as to provide access space between the idler roller sets 380 and the drive belt 342 for insertion and removal of flexible lance hoses.

Figure 7:
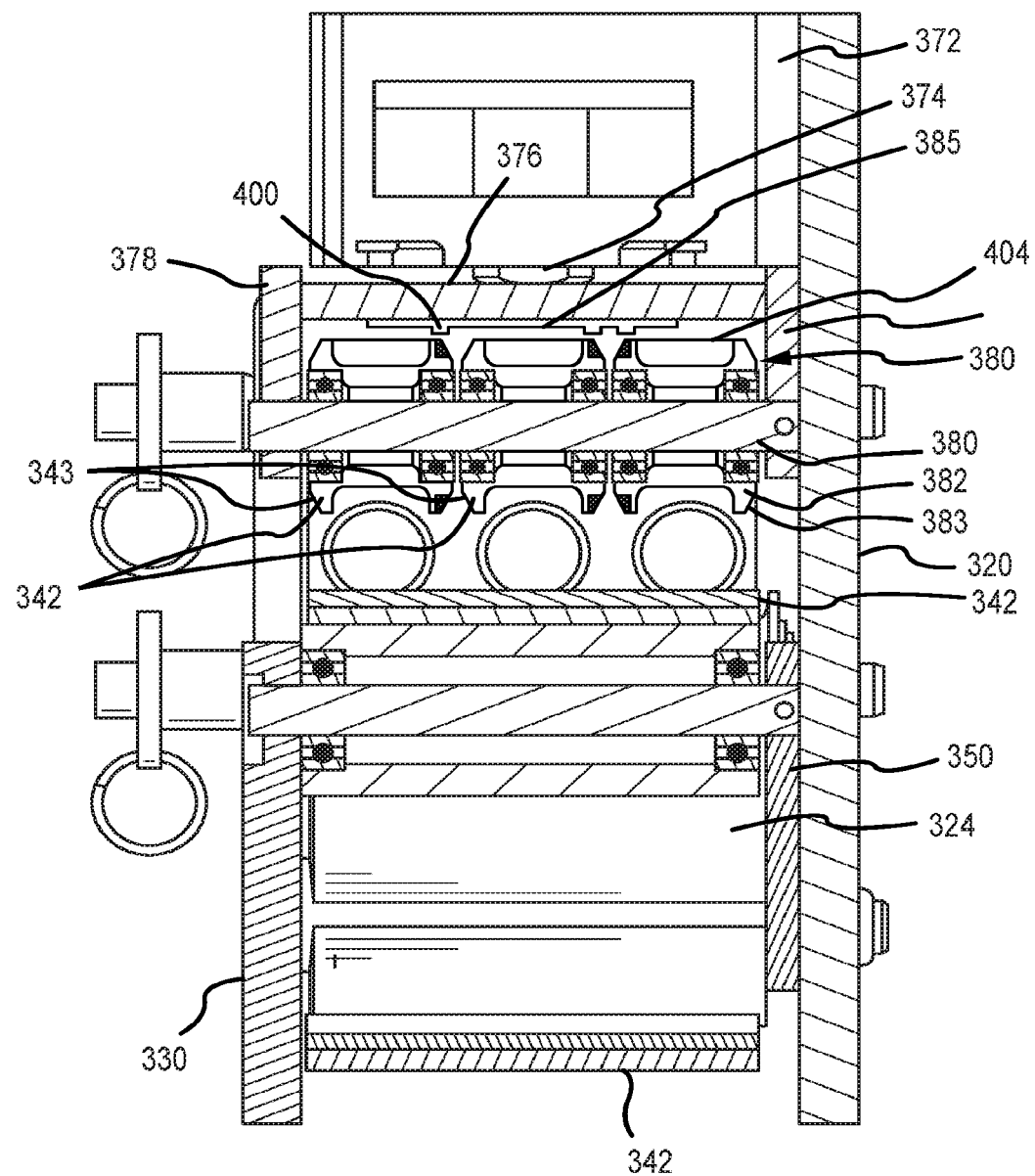
FIG. 7 is a partial vertical sectional view through belt and lance portion of the drive apparatus shown in FIG. 4 taken on the line 7-7.

One set of idler rollers 380 is made up of three independent spool shaped bearing supported rollers 382 shown in the sectional view through the apparatus 300 shown in FIG. 7. This particular set 380 of idler rollers 382 is positioned adjacent hall effect sensors 400, 402, and 404, mounted on a circuit board 385 fastened to the underside of the carrier block 376, to detect distance traveled by each hose being driven through the drive apparatus 300. Each roller 382 is a spool shaped roller having a central concave, or U shaped, groove bounded by opposite circular rims 383. One of the rims 383 of each roller 382, preferably an inboard rim 383, carries a series of 24 magnets embedded around the rim 383, each having an opposite polarity in series facing radially outward.

The printed circuit board 385 fastened to the underside surface of the upper support block 376 carries 3 hall effect sensors 400, 402, and 404 each arranged adjacent one of the rims 383. As each roller 382 rotates, for example, by 15 degrees, one of the magnets passes beneath its adjacent sensor 400, 402, or 404 on the pcb 385 and a polarity change is detected. These changes are counted and converted to precise relative lance distance traveled for that particular lance (not shown). In this way, very precise distance traveled by the lance can be determined irrespective of the distance traveled by an adjacent lance driven by the drive apparatus 300.

Each idler roller set 380 is carried on a stationary axle 390 fastened between the idler frame rails 378. Only one idler roller set 380 needs to have separate rollers 382. The other 5 idler roller sets 380 each preferably is a bearing supported cylindrical body having three axially spaced annular spool shaped concave grooves each being complementary to the anticipated lance hose size range. These annular grooves may be V shaped, semicircular, partial trapezoidal, rectangular, or smooth U shaped so as to provide a guide through the apparatus 300 and keep the flexible lances each in desired contact with the endless belt 342 during transit. Preferably the idler rollers 380 and the individual rollers 382 are made of aluminum or other lightweight material capable of withstanding bending loads and each groove has a concave arcuate cross-sectional shape. Each groove may alternatively be a wide almost rectangular slot with corners having a radius profile to allow the hoses to have limited lateral movement as they are fed through the apparatus 300. This latter configuration is preferred in order to accommodate several different lance hose diameters in the drive apparatus 300.

In use, the drive apparatus 300 may be utilized with one, two, or three flexible lances simultaneously. In the case of driving one lance, such a lance would be preferably fed through the center passage through the inlet manifold 316 and beneath the center groove of the idler rollers 380. When two lances are to be driven, the inner and outer passages through collets 318 would be used. If three lances are to be driven, one would be fed through each collet 318 and corresponding groove of each idler roller 380.

In alternative embodiments, more than three lance drive paths may be provided such as 2, 4 or five. Electrical or hydraulic actuators and motors may be used in place of the pneumatic motors shown and described. Although a toothed or spline endless belt is preferred as described and shown above, alternatively a smooth belt or grooved belt with wider spline spacing could be substituted along with appropriately configured drive rollers. The guide rollers 348 are shown as being smooth cylindrical rollers. They may alternatively be splined rollers similar to the drive rollers 346.

Figure 8:
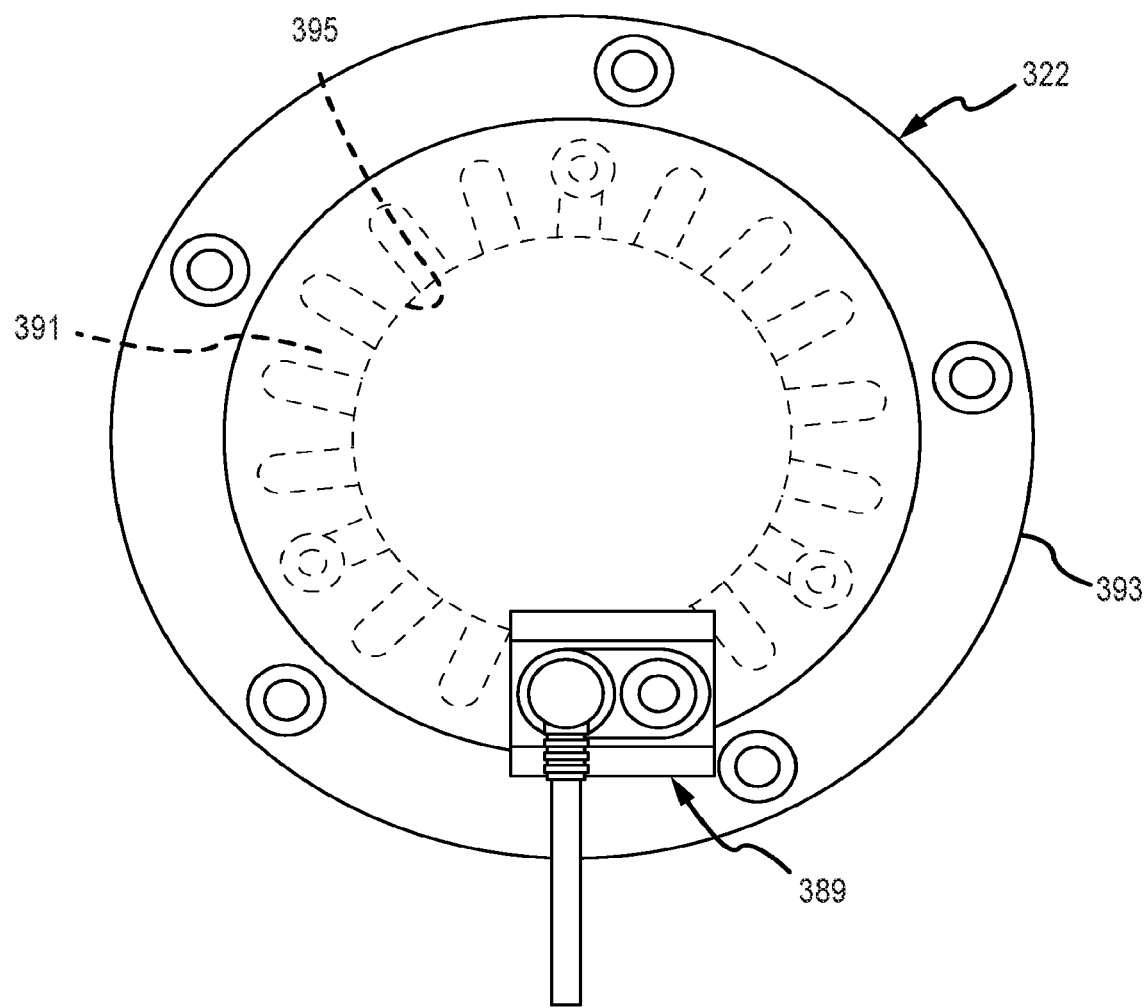
FIG. 8 is a separate side view of one of the belt drive motors with its outer cover shown transparent to reveal an internal annular disc shaped target fastened to the rotor of the motor.

One of the splined belt drive motors, motor 322 in the illustrated embodiment 300, is configured with a differential hall effect sensor 389 to monitor speed and direction of rotation of the drive motor 322, and hence lance travel along the belt 342 through the drive apparatus 300. A separate plan view of drive motor 322 is shown in FIG. 8, with its outer cover shown transparent. An annular notched target disc 391 is fastened to the motor rotor inside the motor housing 393, having spaced notches forming 18 teeth 395. The differential hall sensor 389 fastened to the housing 393 senses passage of each of these teeth 395 and outputs a voltage change signal for each transition. The signal output is indicative of direction of rotation and speed, which mathematically equates to belt position and hence lance travel distance, assuming no slip between belt and lance hose.

By comparing the position of the lance hoses, i.e. distance traveled as sensed from the follower roller set sensors 400, 402, and 404, for each of the lance hoses, with the belt drive motor speed and direction sensed distance from the signal output of sensor 389, any mismatch is correlated to lance to belt slippage. For example, when driving three lances, if a large mismatch on only one lance occurs, in a three lance drive operation, this is typical of a blockage or restriction in that particular tube being cleaned.

If all the lances, 3 in the illustrated case, have a similar mismatch with respect to the belt drive motor sensed position and/or feed distance, this will be indicative of insufficient clamp pressure. In this instance the operator can simply increase clamp pressure to compensate for the mismatch. The operator can then re-zero the lance position and look for subsequent mismatch. Alternatively an automatic control system can perform this function, as is described in more detail below. In such a case the clamp pressure may be automatically increased to minimize slippage, up to a predetermined maximum applied pressure applied to the follower rollers 380.

In the event of a single lance hose mismatch, as first described above, this indicates a restriction, or blockage, occurring in the tube being cleaned. The sensed mismatch preferably is used to trigger an autostroke sequence of motor 322 instigating reversals as generally described above, to move the lance hoses back and forth in the tubes being cleaned, until the blockage or restriction is reduced or eliminated, as determined by re-zeroing the position of the mismatched lances and continuing the cleaning operation as needed, until another mismatch above an operator determined threshold occurs.

Figure 11:
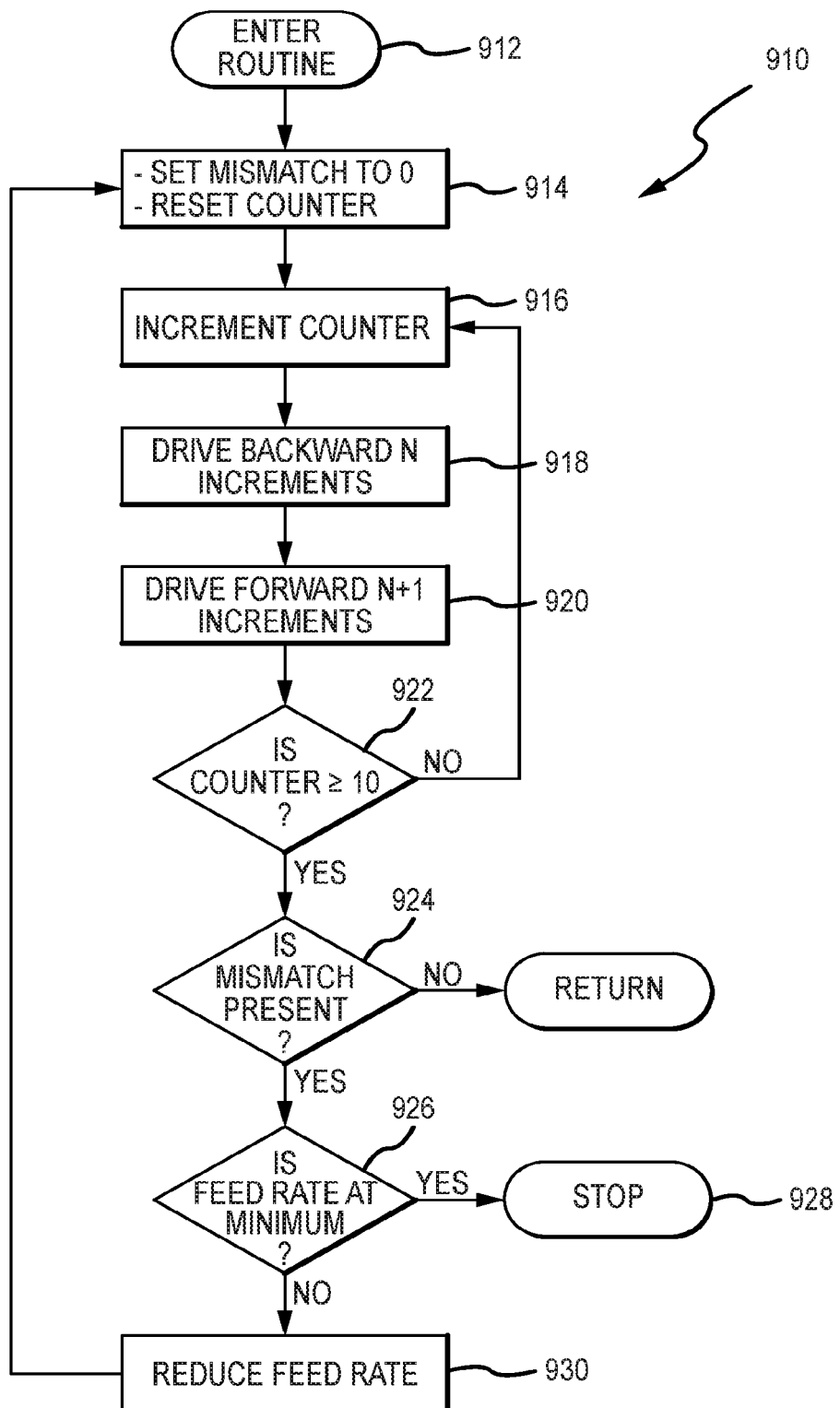
FIG. 11 is a process flow diagram for the Autostroke subroutine in accordance with the present disclosure.

The drive apparatus 300 may include the comparator circuitry to compare the signals from each of the sensors 400, 402, and 404 with the signal from the drive motor sensor 389. The drive apparatus 300 may also include a comparator that compares the signals between each of the sensors 400, 402 and 404, as the lance position of each lance should be relatively close to each other since the only drive force is from the contact with the drive belt 342. Alternatively the comparator circuitry may be handled via microprocessor in a system controller separate from the apparatus 300. In either case, an exemplary signal processing circuit is shown, in simplified block diagram form in FIG. 9 and process flow diagrams FIGS. 10, 11 and 12.

Figure 9:
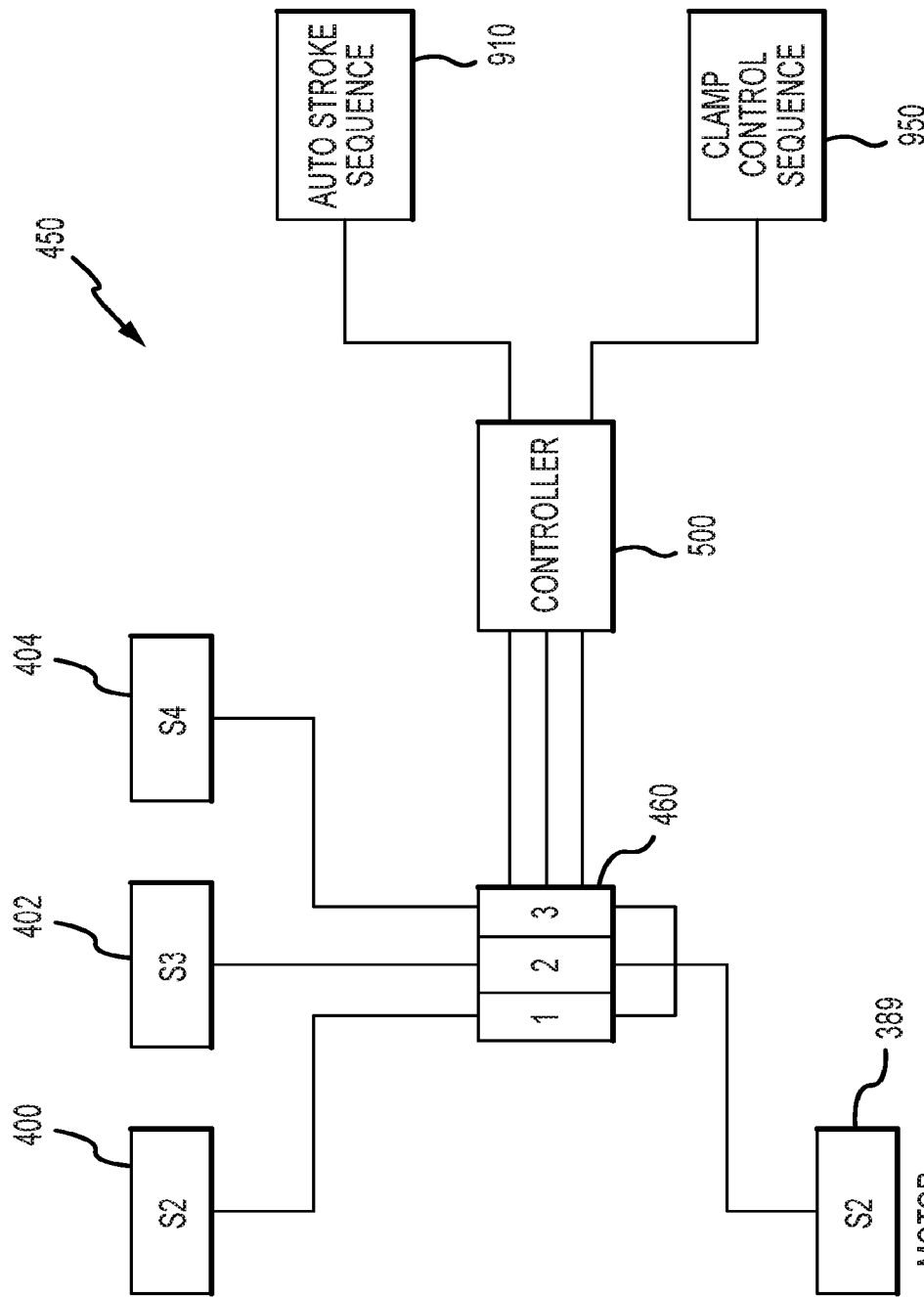
FIG. 9 is a simplified block diagram of the signal processing circuitry in the apparatus shown in FIGS. 4-8.
Figure 10:
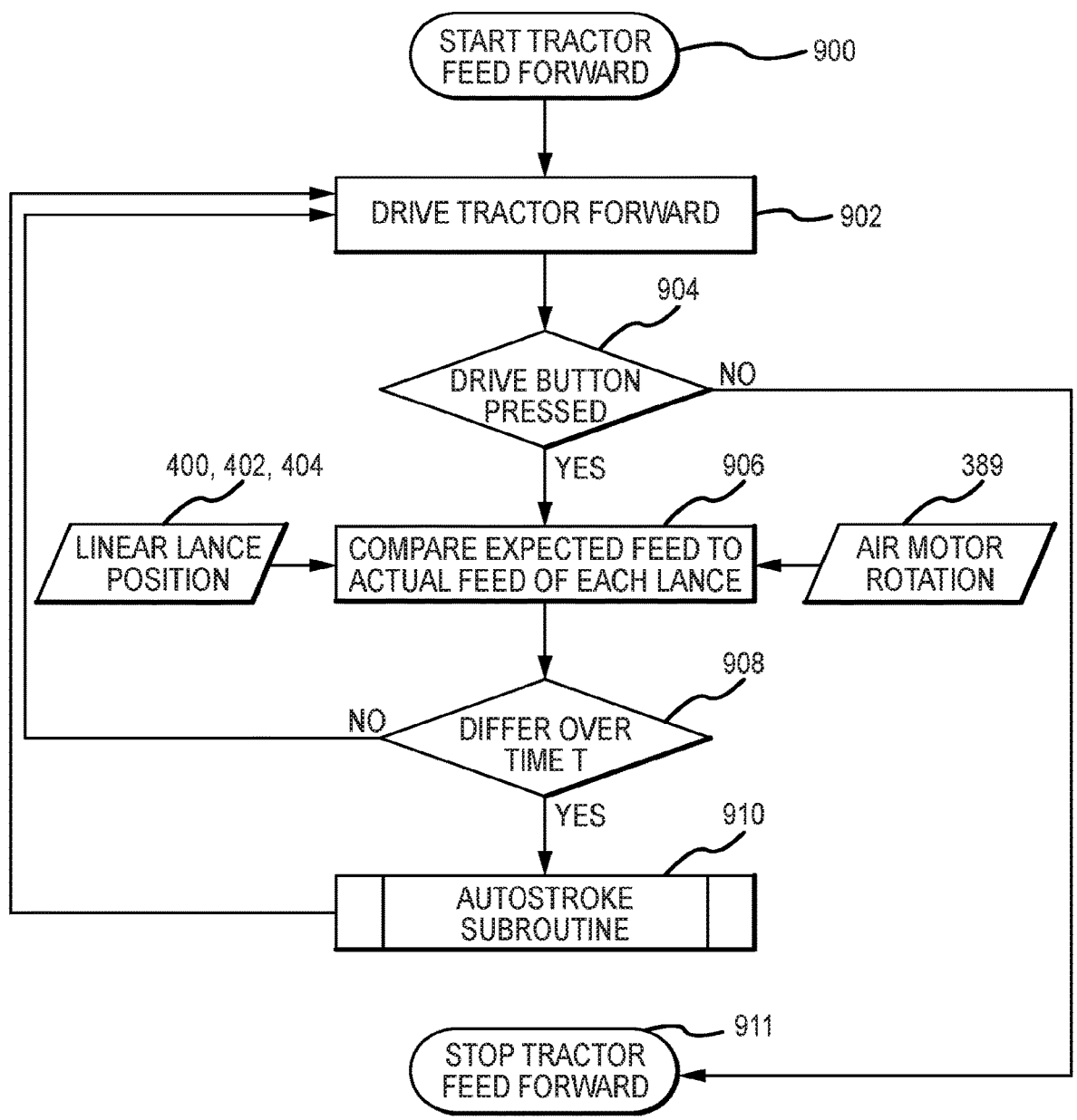
FIG. 10 is a process flow diagram for the Autostroke functionality for the embodiment shown in FIGS. 4-8.

A simplified functional block diagram 450 for autostroke control for the apparatus 300 is shown in FIG. 9. Motor sensor 389 feeds an input into three comparators 460 each of which in turn send an input to controller 500. At the same time, the sensors 400, 402 and 404 also send signals to the comparators 460. The controller 500 serves two major functions: autostroke to remove tube blockages, and clamp pressure control. The autostroke functionality is described below with reference to FIGS. 10 and 11. The clamp pressure may be adjusted manually or may be controlled automatically as described in FIG. 12.

Operational control of the apparatus 300, basically called a tractor, begins in operation 900, when a feed forward operation is selected by the operator on a cleaning system controller (not shown). This controller may be floor mounted or may be a hand held controller that communicates either wired or wirelessly with the apparatus 300. Once feed forward operation is selected, control transfers to tractor forward operation 902 which queries in operation 904 whether the Drive button has been pressed. If the answer is yes, control transfers to comparator operation 906. If however, in query operation 904, the Drive button has not been pressed, control immediately transfers to stop operation 911 where tractor forward operation is stopped.

Assuming the Drive button has been pressed, forward operation 902 energizes the drive motors 322 and 324 causing the endless belt 342 to pull 1, 2 or 3 lances along the pathway between inlet manifold 314 and outlet manifold 316 through the apparatus 300. As the lances move along the endless belt 342, their movement causes the follower rollers 382 to rotate, sending signals, picked up by sensors 400, 402 and 404, to comparators 460. At the same time, sensor 389 on motor 322 sends a similar signal to each of the comparators 460.

Operation 906 receives linear lance position information from sensors 400, 402, and 404 via the circuit board 385 for each lance. Comparator operation 906 also receives belt position information from the sensor 389 on the drive motor 322. In operation 906, the received signals are converted to actual lance feed distances and the expected feed distance is compared to the actual feed distance of each lance.

Control then transfers to query operation 908 where the question is asked whether expected feed to actual feed of each lance differs over time. In other words, whether there is a mismatch between expected feed distance and actual distance fed. If below a user settable difference, the answer is NO, a "continue drive" control signal is sent back to operation 902 and the tractor continues to drive the lances forward. On the other hand, if there is a substantial difference in expected to actual feed for any one of each individual lance, then the answer is YES, and control transfers to Autostroke subroutine operation 910, shown in detail in FIG. 10. On the other hand, if there is a substantial difference in expected to actual feed, i.e. a mismatch, for more than one individual lance detected in operation 908, this is indicative of insufficient clamp pressure, and the controller 500 transfers control to clamp pressure operational sequence 950 described in FIG. 12.

An autostroke routine begins in operation 912. Control then transfers to reset operation 914 where the lance to motor difference for each lance is set to zero and an incrementing counter is set to zero. Control then transfers to operation 916 where the increment counter is advanced by 1. Control then transfers to operation 918 where drive apparatus 300 is signaled to drive backward for N increments. Control then transfers to operation 920, where the drive apparatus 300 is signaled to drive forward N+1 increments. Control then transfers to query operation 922.

Query operation 922 asks whether the counter value is greater than or equal to 10, or a predetermined number other than 10. If the answer is no, control transfers back to operation 916 where the counter is incremented again and the process operations 918, 920 and 922 are repeated. If the answer in query operation 922 is yes, the counter is greater than or equal to 10, control transfers to query operation 924 which asks whether a mismatch between lance position and motor position counts still exists. If the answer is yes, a mismatch is still present, this indicates that there is still a blockage or restriction in the target tube or tubes. Control transfers to operation 926.

In query operation 926, the question is asked whether the apparatus 300 feed rate is at a minimum. If the answer is yes, control transfers to stop operation 928. This indicates that an unremovable obstruction has been encountered, requiring manual operator action to mark the tube as blocked or take other appropriate action. In query operation 926, if the answer is no, feed rate is not yet at minimum, control transfers to operation 930.

In operation 930, the tractor feed rate of apparatus 300 is reduced. Control then transfers back to operation 914 where the lance to drive position mismatch is set to zero and the incrementing counter are set to zero, and the iterative process of operations 916 through 924 is repeated.

On the other hand, if in query operation 924, there is no mismatch present, this means that either no obstacle is now sensed, i.e. the obstacle has been cleared, and control returns to operation 902, where normal tractor drive forward operation is resumed, until the drive button in operation 904 is released, which stops tractor forward feed in operation 911.

Figure 12:
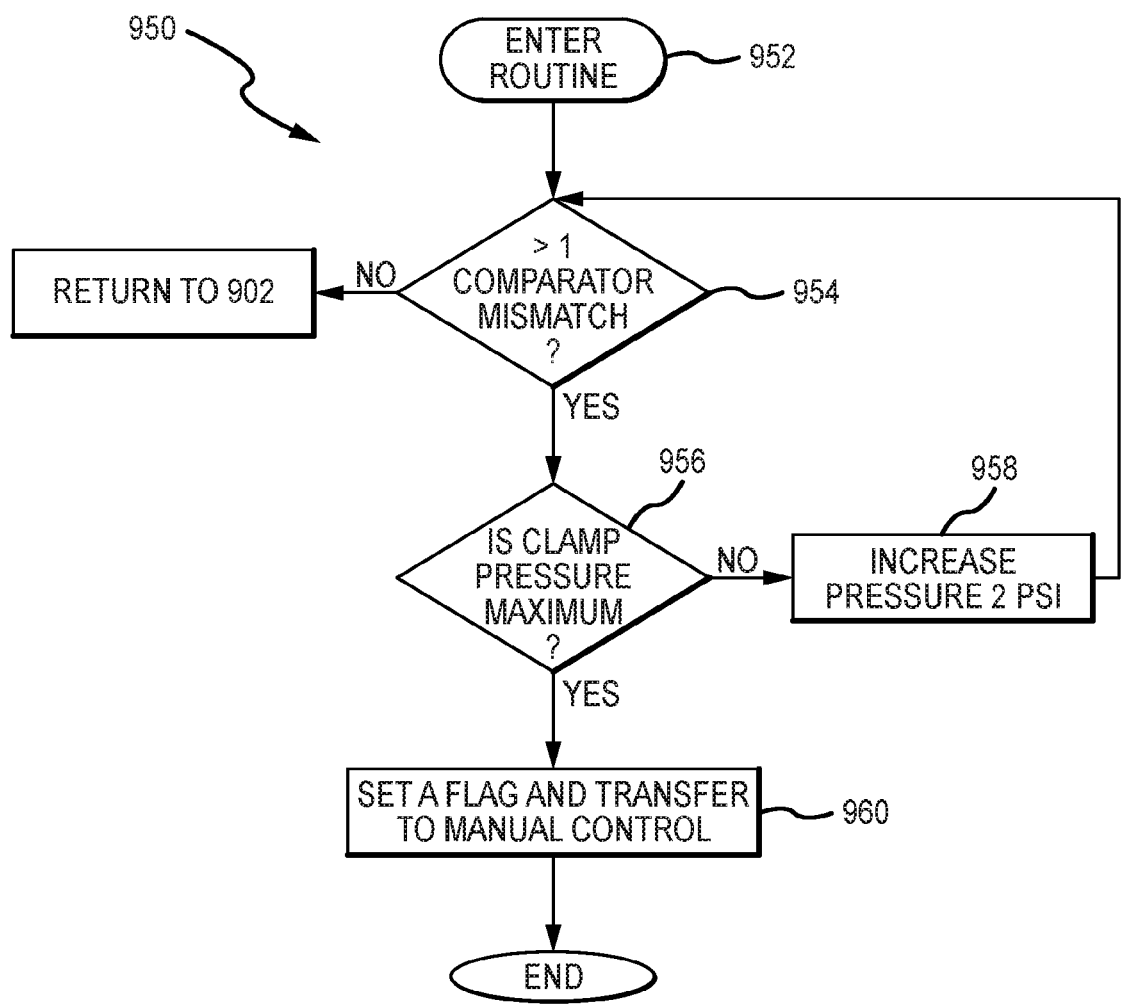
FIG. 12 is a process flow diagram for the automated clamp pressure control in accordance with the present disclosure.

A process flow diagram 950 of the controller 500 is shown in FIG. 12 for adjusting the clamp pressure of pistons 374 to press follower rollers 380 against a set of one or more hoses (not shown) being driven along the endless belt 342 Basically, if there is a mismatch as determined by comparators 460 for more than one lance hose, this is potentially indicative of insufficient clamp pressure. The process begins in operation 952. The controller 500 senses if a lance hose registers a mismatch in operation 952. Control then transfers to query operation 954, which asks if there is more than one lance comparator signaling a mismatch. If so, control transfers to query operation 956. If not, control transfers back to operation 902 described above.

In query operation 956, the query is made whether clamp pressure is at or above a predetermined maximum pressure. If the answer is yes, control transfers to operation 960 where a flag is sent and clamp pressure control is transferred to manual for the operator to assess and take appropriate action. If the answer in query operation 956 is no, pressure is not at maximum, control transfers to operation 958, where clamp pressure is increased by a predetermined amount, such as 2 psi. Control then transfers back to query operation 954 and operations 954, through 956 are repeated until the mismatch determined in operation 954 is less than or equal to 1. Control then transfers back to operation 902 described above.

Many variations are envisioned as within the scope of the present disclosure. For example, all components of the control box 220 may be physically housed within the control console 200. Alternatively, the components within the control box 220 could be integrated into the drive apparatus 100 or into the drive apparatus 300. In the case of Drive apparatus 300, the control circuitry may be housed in a separate hand held controller as described in concurrently filed patent application, U.S. application Ser. No. 16/662,762, the content of which is incorporated herein by reference in its entirety. The number of drive reversals in the Autostroke sequence is predetermined, but it may be any number. A value of >=10 was chosen as merely exemplary. In alternative embodiments, electrical or hydraulic actuators and motors may be used in place of the pneumatic motors shown and described herein.

Furthermore, the follower roller need not be one of the follower rollers 382 shown in FIG. 5. The follower rollers that operate with the sensors 400, 402, 404 may be a separate spring loaded structure that presses on the flexible lance hose or hoses. The sensors may be other than Hall effect sensors specifically mentioned above. For example, gear tooth sensors may be used. Hall effect sensors described above are merely exemplary of one embodiment. Different automated routines and subroutines than as described above may be utilized to control the operation of the apparatus 300. In addition, the apparatus 300 may be configured with status lights to indicate mismatches between lances and the drive motor, lance relative position, as well as such things as feed rate and other indications of proper operation. These may include lance withdrawal stop indicators and lance insertion stop indicators positioned on the inlet and outlet manifolds 314 and 316. Therefore, all such changes, alternatives and equivalents in accordance with the features and benefits described herein, are within the scope of the present disclosure. Such changes and alternatives may be introduced without departing from the spirit and broad scope of this disclosure as defined by the claims below and their equivalents.

What is claimed is:

1. A flexible high pressure fluid cleaning lance drive apparatus comprising:
   at least one drive motor that provides a driving force for advancing and retracting one or more flexible lance hoses that includes at least a first flexible lance hose;
   a first sensor that monitors the drive motor for determining an expected feed distance of the one or more flexible lance hoses;
   a second sensor for determining an actual feed distance of the first flexible lance hose; and
   a first comparator coupled to the first and second sensors, wherein the first comparator is operable to determine a first mismatch between the expected feed distance and the actual feed distance of the first flexible lance hose.

2. The apparatus according to claim 1, wherein the one or more flexible lance hoses includes a second lance hose, and wherein the apparatus further comprises a third sensor for determining an actual feed distance of the second flexible lance.

3. The apparatus according to claim 2 further comprising a second comparator operable to determine a second mismatch between the expected feed distance and the actual feed distance of the second flexible lance hose.

4. The apparatus according to claim 3 further comprising a controller coupled to the first comparator and the second comparator, wherein the controller is operable to initiate an autostroke sequence of operations upon the first mismatch and second mismatch differing by a predetermined threshold, wherein the autostroke sequence of operations includes operating the drive motor in the reverse direction to retract the one or more flexible lance hoses and then operating the drive motor in the forward direction to advance the one or more flexible lance hoses.

5. The apparatus according to claim 3, wherein the one or more flexible lance hoses includes a third flexible lance hose, and wherein the apparatus further comprises a fourth sensor for determining an actual feed distance of the third flexible lance hose.

6. The apparatus according to claim 5 wherein the first sensor is a Hall Effect sensor arranged to measure increments of rotation of the at least one drive motor, and wherein each of the second, third, and fourth sensors are Hall effect sensors arranged to measure increments of rotation of a corresponding follower roller engaged with one of the first flexible lance hose, the second flexible lance hose, and the third flexible lance hose.

7. The apparatus according to claim 5 further comprising a third comparator operable to determine a third mismatch between the expected feed distance and the actual feed distance of the third flexible lance hose.

8. The apparatus according to claim 7 further comprising a controller coupled to the first comparator, the second comparator, and the third comparator, wherein the controller is operable to initiate an autostroke sequence of operations upon any one of the first, second, and third mismatches exceeding a predetermined threshold, wherein the autostroke sequence of operations includes operating the drive motor in the reverse direction to retract the one or more flexible lance hoses and then operating the drive motor in the forward direction to advance the one or more flexible lance hoses.

9. The apparatus according to claim 8, wherein the controller is operable to modify clamping force if the first, second and third mismatches exceed a different predetermined threshold.

10. The apparatus according to claim 1 wherein the first sensor is a Hall effect sensor arranged to measure increments of rotation of the at least one drive motor, and wherein the second sensor is a Hall effect sensor arranged to measure increments of rotation of a first follower roller engaged with the first flexible lance hose.

11. A flexible high pressure fluid cleaning lance drive apparatus comprising:
at least one drive motor that provides a driving force for advancing and retracting one or more flexible lance hoses; a first sensor that monitors the drive motor for determining an expected feed distance of the one or more flexible lance hoses;
a plurality of second sensors for determining an actual feed distance of each flexible lance hose of the one or more flexible lance hoses; and
a first comparator coupled to the first sensor and each second sensor, wherein the first comparator is operable to determine a mismatch between the expected feed distance of the one or more flexible lance hoses and the actual feed distance of each flexible lance hose.

12. The apparatus according to claim 11 further comprising a second comparator coupled to each second sensor, wherein the second comparator is operable to compare the actual feed distance of each of the corresponding flexible lance hoses with each other to determine another mismatch therebetween.

13. The apparatus according to claim 12 further comprising a controller coupled to the second comparator, wherein the controller is operable to initiate an autostroke sequence of operations upon the another mismatch exceeding a predetermined threshold, wherein the autostroke sequence of operations includes operating the drive motor in the reverse direction to retract the one or more flexible lance hoses and then operating the drive motor in the forward direction to advance the one or more flexible lance hoses.

14. The apparatus according to claim 11 further comprising a controller coupled to the second comparator, wherein the controller is operable to initiate a change of clamp force if the mismatch between the expected feed distance and the actual feed distance exceed a predetermined threshold.

15. A flexible high pressure fluid cleaning lance drive apparatus comprising:
at least one drive motor that provides a driving force for advancing and retracting one or more flexible lance hoses;
a first sensor that monitors the drive motor for determining an expected feed distance of the one or more flexible lance hoses;
a plurality of second sensors for determining an actual feed distance of each flexible lance hose of the one or more flexible lance hoses;
a first comparator coupled to the first sensor and each second sensor, wherein the first comparator is operable to determine a mismatch between the expected feed distance of the one or more flexible lance hoses and the actual feed distance of each flexible lance hose; and
a second comparator coupled to each of the second sensors operable to determine a mismatch between the actual feed distance of each flexible lance hose.

16. The apparatus according to claim 15 wherein the first sensor is a Hall effect sensor arranged to measure increments of rotation of the at least one drive motor, and wherein the plurality of second sensors are Hall effect sensors arranged to measure increments of rotation of a corresponding follower roller engaged with one of the flexible lance hoses.

17. The apparatus according to claim 15 further comprising a controller coupled to the second comparator, wherein the controller is operable to initiate an autostroke sequence of operations upon the mismatch between the actual feed distance of each flexible lance hose exceeding a predetermined threshold, wherein the autostroke sequence of operations includes operating the drive motor in the reverse direction to retract the one or more flexible lance hoses and then operating the drive motor in the forward direction to advance the one or more flexible lance hoses.

18. The apparatus according to claim 17 wherein the first sensor is a Hall effect sensor arranged to measure increments of rotation of the at least one drive motor, and wherein the plurality of second sensors are Hall effect sensors arranged to measure increments of rotation of a corresponding follower roller engaged with one of the flexible lance hoses.

19. The apparatus according to claim 15 further comprising a controller coupled to the second comparator, wherein the controller is operable to initiate a change of clamp force if the mismatch between the expected feed distance of the one or more flexible lance hoses and the actual feed distance of each flexible lance hose.

20. The apparatus according to claim 15 wherein the drive motor has a flat annular toothed disc fastened to a motor rotor within a motor housing and the first sensor is a Hall effect sensor fastened to the motor housing.

21. A method of clearing an obstruction with a flexible high pressure fluid cleaning lance drive apparatus that includes a flexible lance hose, the method comprising:
generating a command signal to cause a drive motor to advance the flexible lance hose through a tube;
identifying the obstruction in the tube based on a comparison of an expected feed distance of the flexible lance hose and an actual feed distance of the flexible lance hose;

initiating an autostroke sequence of operations in response to identifying the obstruction, wherein the autostroke sequence of operations includes operating the drive motor in a reverse direction to at least partially retract the flexible lance hose and then operating the drive motor in a forward direction to re-advance the flexible lance hose through the tube; and repeating the identifying step and the initiating step until the obstruction is cleared.

22. The method of claim 21, wherein the identifying step further comprises:

determining the expected feed distance from sensing data captured by a first sensor that monitors increments of rotation of the drive motor; and determining the actual feed distance from sensing data captured by a second sensor that monitors increments of rotation of a follower roller engaged with the flexible lance hose.

23. The method of claim 22, wherein the identifying step further comprises:

determining a difference between the expected feed distance with the actual feed distance;

comparing the difference with a predetermined threshold; and identifying the obstruction in response to the difference exceeding the predetermined threshold.

* * * * *